US011291159B2

(12) United States Patent
Merkt (10) Patent No.: US 11,291,159 B2
(45) Date of Patent: Apr. 5, 2022

(54) TURFTRIMMER ROTARY MOWING ATTACHMENT

(71) Applicant: G2 Turftools, Inc., Athens, AL (US)

(72) Inventor: Eric Merkt, Athens, AL (US)

(73) Assignee: G2 Turftools, Inc., Athens, AL (US)

( * ) Notice: Subject to any disclaimer, the term of this patent is extended or adjusted under 35 U.S.C. 154(b) by 82 days.

(21) Appl. No.: 16/863,965

(22) Filed: Apr. 30, 2020

(65) Prior Publication Data

US 2020/0253119 A1 Aug. 13, 2020

Related U.S. Application Data

(62) Division of application No. 15/957,401, filed on Apr. 19, 2018, now Pat. No. 10,674,661.

(51) Int. Cl.
| | | |
|---|---|---|
| *A01D 34/86* | (2006.01) | |
| *A01D 34/00* | (2006.01) | |
| *A01D 34/66* | (2006.01) | |
| *A01D 34/84* | (2006.01) | |
| *A01D 34/81* | (2006.01) | |

(Continued)

(52) U.S. Cl.
CPC ......... *A01D 34/863* (2013.01); *A01D 34/008* (2013.01); *A01D 34/661* (2013.01); *A01D 34/76* (2013.01); *A01D 34/81* (2013.01); *A01D 34/84* (2013.01); *A01D 2101/00* (2013.01)

(58) Field of Classification Search
CPC .............. A01D 2101/00; A01D 34/001; A01D 34/015; A01D 34/008; A01D 34/81; A01D 34/661; A01D 34/76; A01D 34/84; A01D 34/86; A01D 34/863
See application file for complete search history.

(56) References Cited

U.S. PATENT DOCUMENTS 2,838,901 A 6/1958 Davis
3,241,302 A * 3/1966 Robert ................. A01D 34/863
56/13.6

(Continued)

FOREIGN PATENT DOCUMENTS

CN 104186100 2/2014
CN 205961824 2/2017

(Continued)

OTHER PUBLICATIONS

CIPO; Examination Search Report for Canadian Patent Application No. 3,039,189 dated Apr. 7, 2020.

(Continued)

*Primary Examiner* — Adam J Behrens
(74) *Attorney, Agent, or Firm* — Kirk A. Wilson; Joseph T. Guy; Patent Filing Specialist Inc.

(57) ABSTRACT

A device for trimming around stationary objects is disclosed as a rotary mowing attachment with a cutting head assembly slidably coupled to a carrier assembly that is positioned by a slope control circuit and controller. The cutting head assembly has at least two counter-rotating blades, at least one rotator motor configured to rotate the cutting head assembly about a cutting head central axis, at least one blade drive motor configured to drive the at least two counter-rotating blades, and at least one lateral motion drive motor configured to move the cutting head assembly position relative to the carrier assembly.

11 Claims, 8 Drawing Sheets

(51) Int. Cl.
*A01D 34/76* (2006.01)
*A01D 101/00* (2006.01)

(56) References Cited

U.S. PATENT DOCUMENTS

| | | | | |
|---|---|---|---|---|
| 3,715,872 | A * | 2/1973 | Thompson, Jr. | A01D 34/863 56/10.4 |
| 4,901,508 | A * | 2/1990 | Whatley | A01D 34/863 56/10.4 |
| 5,396,754 | A * | 3/1995 | Fraley | A01D 34/863 56/15.2 |
| 5,826,414 | A | 10/1998 | Lenczuk | |
| 5,960,614 | A * | 10/1999 | Jones | A01D 34/863 172/245 |
| 6,185,916 | B1 * | 2/2001 | Johnson | A01D 34/416 56/12.7 |
| 6,591,592 | B1 * | 7/2003 | Krimminger | A01D 34/863 56/10.4 |
| 6,860,093 | B2 * | 3/2005 | Scordilis | A01D 34/863 56/15.2 |
| 7,363,754 | B2 * | 4/2008 | Cartner | A01D 34/863 56/10.4 |
| 7,690,177 | B2 * | 4/2010 | Spitzley | A01D 34/84 56/14.9 |
| 8,316,627 | B1 * | 11/2012 | Fraley | A01D 34/84 56/10.4 |
| 8,713,904 | B1 * | 5/2014 | Goudy | A01D 34/863 56/15.5 |
| 9,010,076 | B2 * | 4/2015 | Hafner | A01D 34/835 56/6 |
| 9,167,738 | B1 | 10/2015 | Serimian | |
| 9,220,194 | B2 | 12/2015 | Ulmefors et al. | |
| 9,844,178 | B2 | 12/2017 | Coutu | |
| 2002/0174638 | A1 * | 11/2002 | Borgesen | A01D 34/863 56/14.9 |
| 2006/0026940 | A1 * | 2/2006 | Cartner | A01D 34/863 56/11.9 |
| 2009/0249758 | A1 * | 10/2009 | Weeden | A01D 34/863 56/15.7 |
| 2017/0118913 | A1 * | 5/2017 | Coutu | A01D 34/84 |
| 2017/0150677 | A1 | 6/2017 | Hoppel | |
| 2019/0174672 | A1 * | 6/2019 | Ku | A01D 34/86 |
| 2019/0183040 | A1 * | 6/2019 | Simmons | A01D 34/4163 |

FOREIGN PATENT DOCUMENTS

| | | | | |
|---|---|---|---|---|
| DE | 9311854 | U1 * | 10/1993 | A01D 34/863 |
| DE | 4305135 | A1 * | 10/1994 | A01D 34/863 |
| DE | 20211861 | U1 * | 11/2002 | A01D 34/866 |
| DE | 10321683 | A1 * | 12/2004 | A01D 34/863 |
| DE | 202005009008 | U1 * | 12/2005 | A01D 34/863 |
| DE | 102005035636 | A1 * | 2/2007 | A01D 34/863 |
| DE | 102009033706 | A1 * | 1/2011 | A01D 34/863 |
| DE | 102011100282 | A1 * | 10/2012 | A01D 34/863 |
| EP | 1527670 | A2 * | 5/2005 | A01D 34/863 |
| EP | 1847168 | A1 * | 10/2007 | A01D 34/863 |
| EP | 2189054 | A1 * | 5/2010 | A01D 34/863 |
| EP | 2210466 | | 7/2010 | |
| EP | 2878186 | | 6/2015 | |
| FR | 2942691 | A1 * | 9/2010 | A01D 34/863 |
| FR | 2948850 | A1 * | 2/2011 | A01D 34/863 |
| FR | 3016493 | A1 * | 7/2015 | A01D 34/863 |
| KR | 20150030991 | | 3/2015 | |
| WO | WO1998006251 | | 2/1998 | |
| WO | WO-03007691 | A1 * | 1/2003 | A01D 34/863 |
| WO | WO2007052324 | | 5/2007 | |
| WO | WO-2007052324 | A1 * | 5/2007 | A01D 34/863 |

OTHER PUBLICATIONS

CIPO; Notice of Allowance issued for Canadian Patent Application No. 3,039,189; dated Oct. 29, 2020.

\* cited by examiner

TURFTRIMMER ROTARY MOWING ATTACHMENT

CROSS-REFERENCE TO RELATED APPLICATIONS

This application is a divisional of U.S. patent application Ser. No. 15/957,401, filed Apr. 19, 2018, herein incorporated by reference in its entirety.

FIELD OF THE DISCLOSURE

The disclosure relates generally to the field of rotary mowing attachments. More particularly, the present subject matter relates to a rotary mowing attachment assembly configured for mowing around stationary objects.

BACKGROUND OF THE DISCLOSURE

Agricultural implements, such as rotary mowers, are used to cut vegetation and brush along highway areas and ditches. Typically, the mower includes a tractor and a rotary mower or cutter. The rotary mower is operationally connected to the tractor via power driven mechanism, such as a power take-off (PTO). The rotary mower is usually connected to the back of the tractor and is pulled behind the tractor. As the tractor moves forward, the rotary mower mows vegetation and brush.

Existing mowers and attachments for mowing along roadsides cannot sufficiently mow around stationary objects. For example, while a conventional flail mower can mow beneath guard rails and fences, a flail mower cannot mow around a post without requiring that the direction of travel of the mobile machine upon which the flail mower is mounted be changed so that the flail mower can be repositioned relative to the post. Even if such a mower is successfully moved around the post, the area adjacent the post must be mowed a second time using a handheld trimmer, or herbicides or other hazardous substances must be applied to the area adjacent the post to destroy any vegetation that the flail mower could not reach.

Traditional weed cutters must be manually guided around corners and obstacles. Using a vehicle and mower to cut weeds around objects like fence posts, for example, can therefore be a challenge. However, cutting weeds around fence posts with a hand-held weed cutter is quite labor intensive.

BRIEF DESCRIPTION OF THE DISCLOSURE

Aspects and advantages of the disclosure will be set forth in part in the following description, or may be obvious from the description, or may be learned through practice of the disclosure.

In one embodiment, a rotary mowing attachment has a cutting head assembly slidably coupled to a carrier assembly. The cutting head assembly has at least two counter-rotating blades, at least one rotator motor configured to rotate the cutting head assembly about a cutting head central axis, at least one blade drive motor configured to drive the at least two counter-rotating blades, and at least one lateral motion drive motor configured to move the cutting head assembly position relative to the carrier assembly.

In another embodiment, a method for trimming around stationary objects involves positioning a cutting head assembly portion of a rotary mowing attachment in contact with a ground, instructing a slope control circuit to enter a float-mode for the cutting head assembly, extending a boom assembly portion of the rotary mowing attachment to align the cutting head assembly with a stationary object, aligning the cutting head assembly with a slope of the ground to establish a preset slope in the slope control circuit, maintaining and adjusting the preset slope using the slope control circuit, adjusting the cutting head assembly position to establish a zero-start position, engaging a blade drive motor, energizing the slope control circuit to electronically communicate with a slope adjusting assembly to sense and maintain the preset slope and a point-of-avoidance of the cutting head assembly relative to the stationary object, and returning the cutting head assembly to the zero-start position.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

The term "proximate" indicates a position on an element that is closest to the vehicle, whereas the term "distal" indicates a position on an element that is furthest away from the vehicle. Dual-headed arrows shown on the figures indicates the ability of a referenced element to change position in a direction generally parallel with the direction of the arrow.

As shown in the figures, the turf trimmer rotary mowing attachment 150 overcomes many problems associated with available mowers by providing a cutting head assembly 100 featuring multiple rotating blades 102 and a counter-rotating blade 104. The cutting head assembly 100 can be slope-controlled and able to rotate relative to a cutting head central axis 612 in response to approaching a stationary object 802 to be trimmed around. The turf trimmer rotary mowing attachment 150 provides a cutting head with a unique "cloverleaf" shape that rotates around stationary objects 802, cutting weeds and grass from around all grade-level surfaces of the stationary objects 802 while traveling along with a vehicle 700. The mowing attachment 150 can rotate around stationary objects 802 in a controlled pattern which results in a complete mowing and trimming around all grade-level surfaces of a stationary object thereby leaving no area of vegetation un-mowed. The mowing pattern is precisely controlled such that supplemental trimming and/or the use of herbicides or other harmful chemicals to remove un-mowed vegetation is eliminated or substantially reduced. The turf trimmer mowing attachment 150 also eliminates or reduces the costs and hazards associated with applying herbicides or trimming by hand, and increases the speed and efficiency of the mowing process.

The turf trimmer rotary mowing attachment 150 can be used to trim vegetation on roadways, fence lines, pond banks, and around objects with varying ground surface conditions, in a continuous motion from within the safety of a carrier vehicle 700, tractor, utility vehicle, or truck. The mowing attachment 150 greatly reduces, or eliminates the need for roadside trimming crews, adding to the overall speed, efficiency and safety of trimming operations. Previous devices have relied on the operator or mechanical devices to achieve rotation and proximity to the object being trimmed. The mowing attachment 150 employs multiple integrated sensors and electronic controllers to optimize the trimming process.

The turf trimmer rotary mowing attachment 150 can adjust automatically to varying conditions including slope, spacing of objects and distance from roadway. The mowing attachment 150 can use an extending boom 402, a reach boom 404, a float boom 406, and a free floating cutting head assembly 100 supported on a carrier assembly 200 by two or more height adjustable casters 202. The cutting head assembly 100 can adjust its lateral distance from the carrier assembly 200 using a lateral motion drive motor 106 (see FIG. 12). A slope adjusting assembly 300 can use hydraulic cylinders or electric linear actuators controlled by the operator and held on slope by an integrated slope sensor and cylinder. The rotational cutting head assembly 100 can be rotated by a hydraulic rotator motor 108 or electric servo motor capable of input and varying torque to keep objects engaged while trimming. A smart electric servo actuator or smart hydraulic cylinder can move the cutting head assembly 100 in and out to keep the cutting head engaged during the rotating process. The cutting head assembly 100 can first be moved relative to the carrier assembly 200 with adjustments by the lateral motion drive motor 106 (see FIG. 12), then the reach boom 404, then finally the extending boom 402. A hydraulic blade drive motor 110 can power a plurality of rotating cutting blades 102 and at least one counter rotating center blade 104 with pressure sensor(s) that can turn off the drive motor 110 in case of entanglement with roadway or other debris. The design of the cutting blades 102 can lessen the possibility of entanglement and damage when in contact with unknown objects. The mowing attachment 150 can use multiple sensors, ultrasonic, mechanical, and or proximity to ensure optimum placement of the cutting head assembly 100 in relation to the stationary object being trimmed. A slope control circuit 500 with a controller 504 can also control the cutting head assembly 100 rotation and the complex movement around the stationary object. The mowing attachment 150 low profile can allow it to reach under low hanging obstructions such as guard rails 800 or tree limbs. The free floating cutting head assembly 100 can provide uniform cutting height without constant monitoring and adjustments by the operator. The boom assembly 400 can be protected by a breakaway hydraulic cylinder or springs as a biasing element 422 that allows the boom assembly 400 to move in the opposite direction of travel, avoiding damage in case of operator error.

Figure 1:
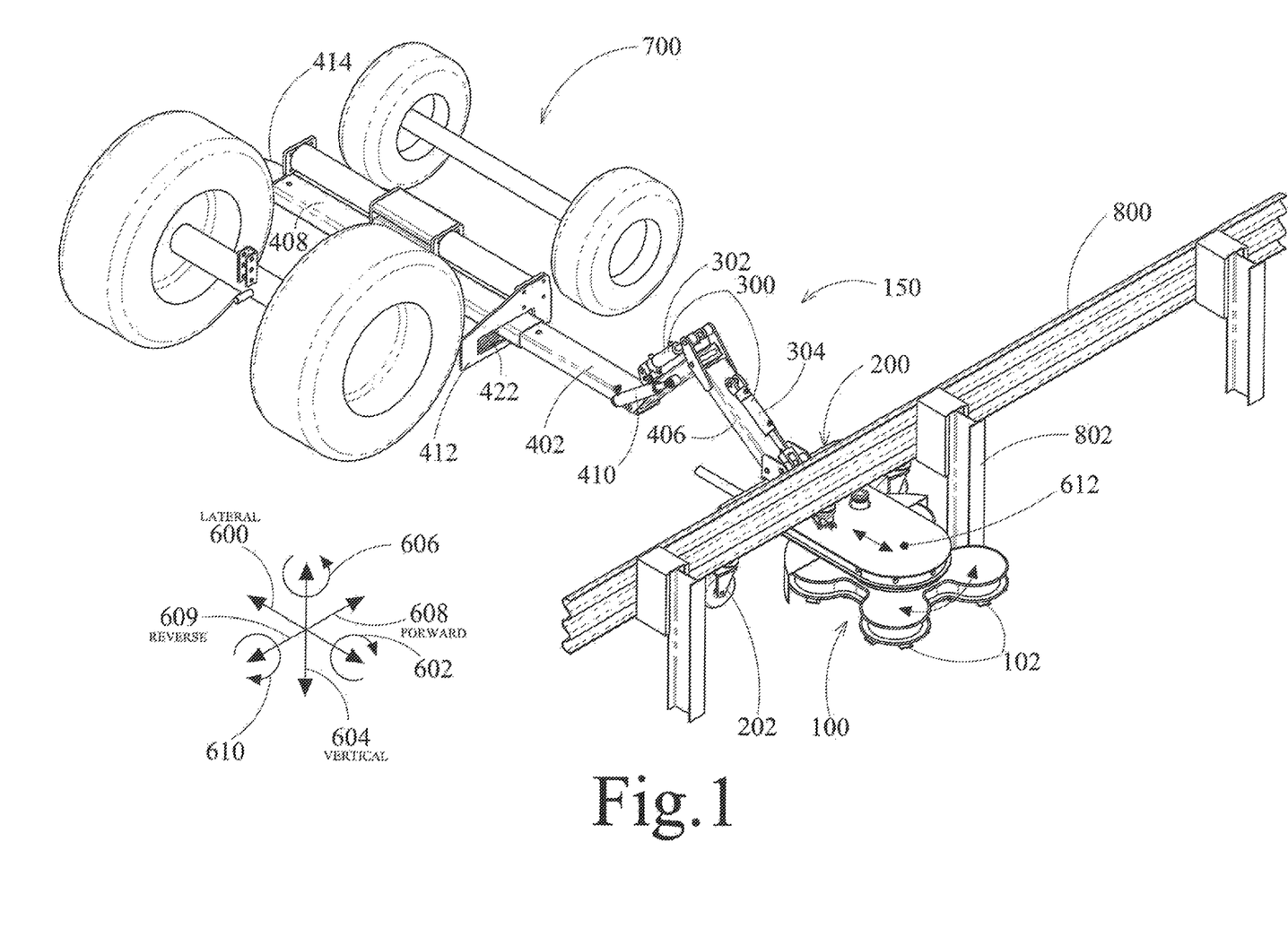
FIG. 1 illustrates an isometric view of one embodiment of the rotary mowing attachment, carried by a vehicle, as it mows near a guard rail.
Figure 2:
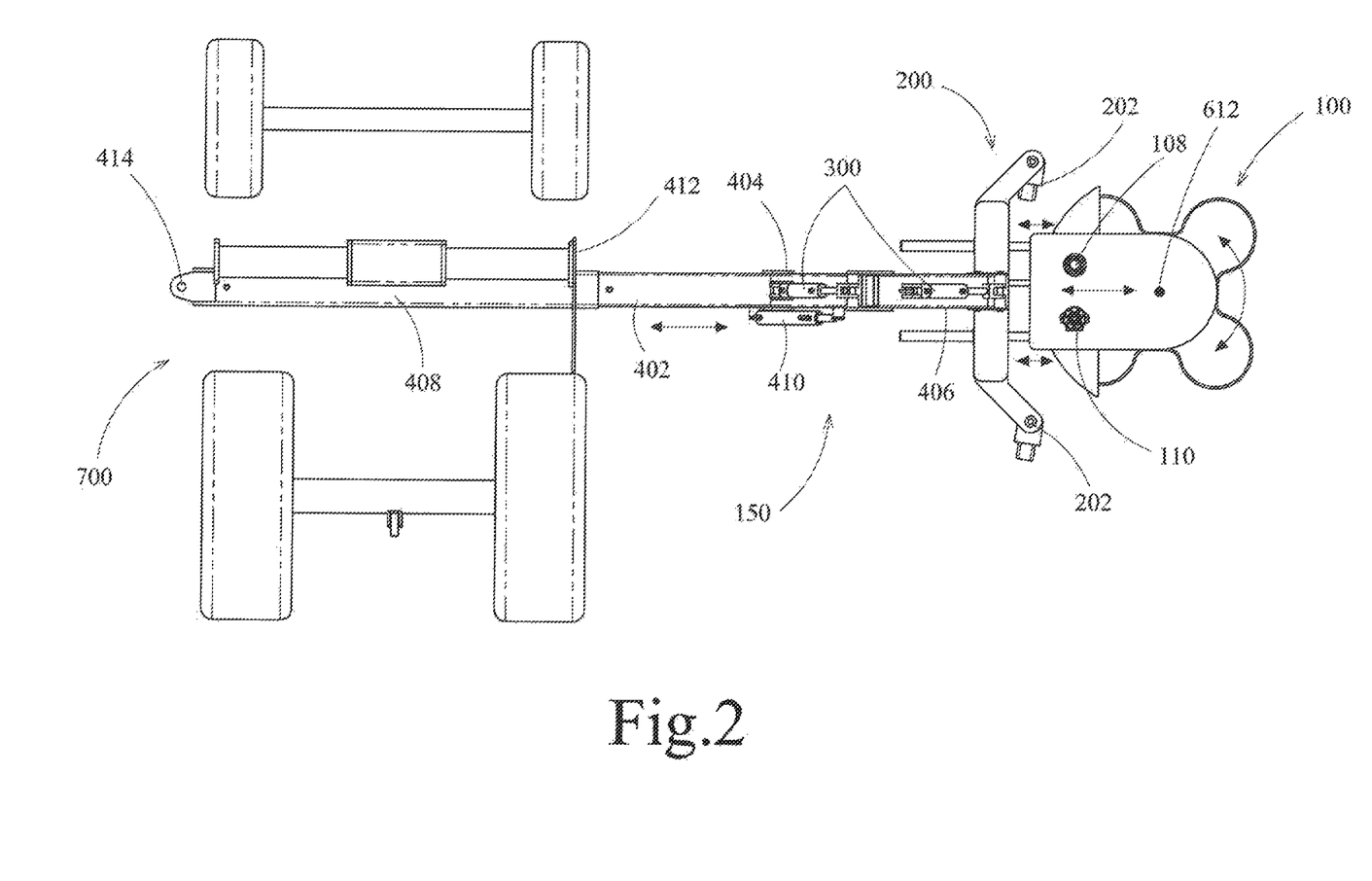
FIG. 2 illustrates a plan view of an embodiment of the rotary mowing attachment showing major components.
Figure 3:
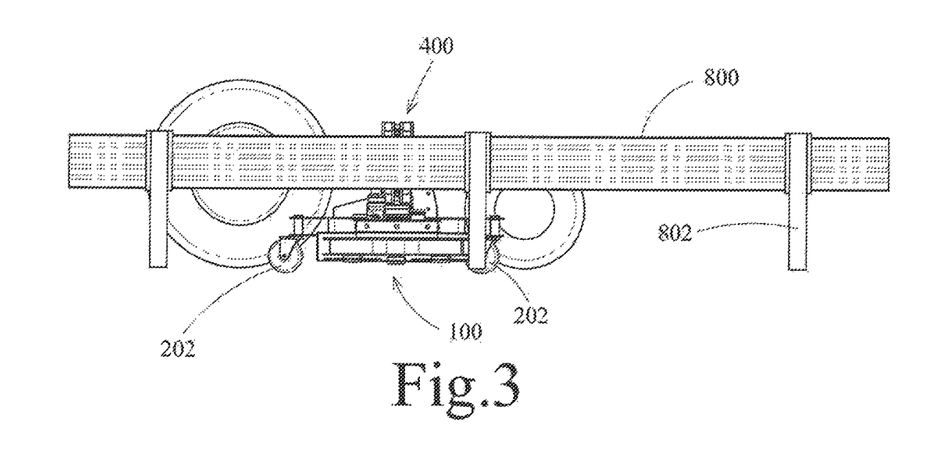
FIG. 3 illustrates a side view of one embodiment of the rotary mowing attachment, carried by a vehicle, as it mows near a guard rail.
Figure 6:
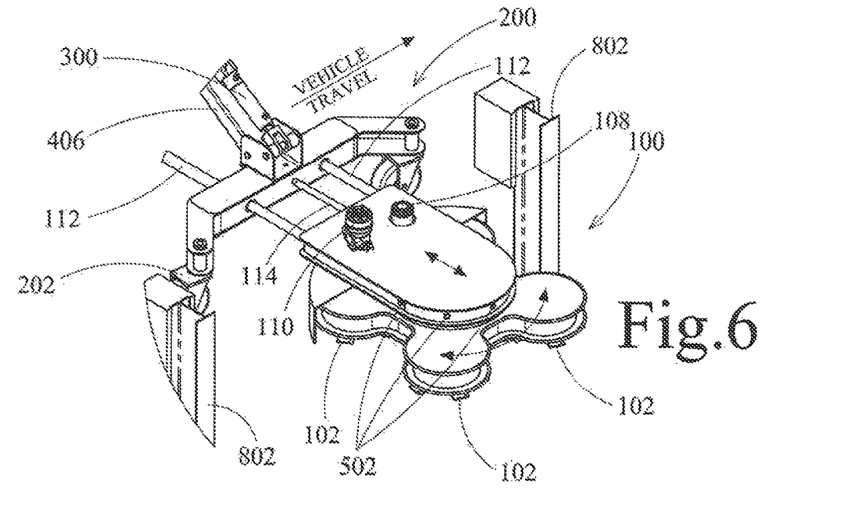
FIGS. 6-8 illustrate a cutting sequence of a rotary mowing attachment as it trims around a stationary object.
Figure 7:
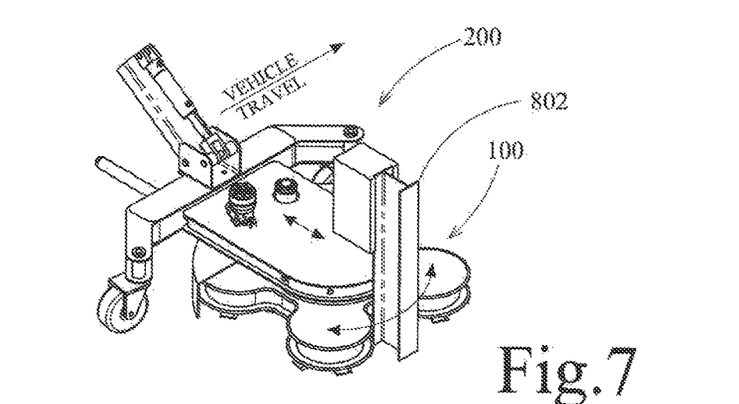
Figure 8:
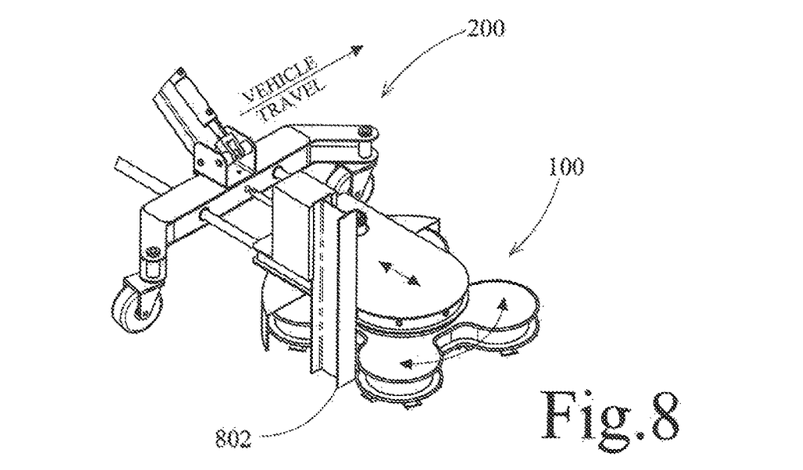
Figure 9:
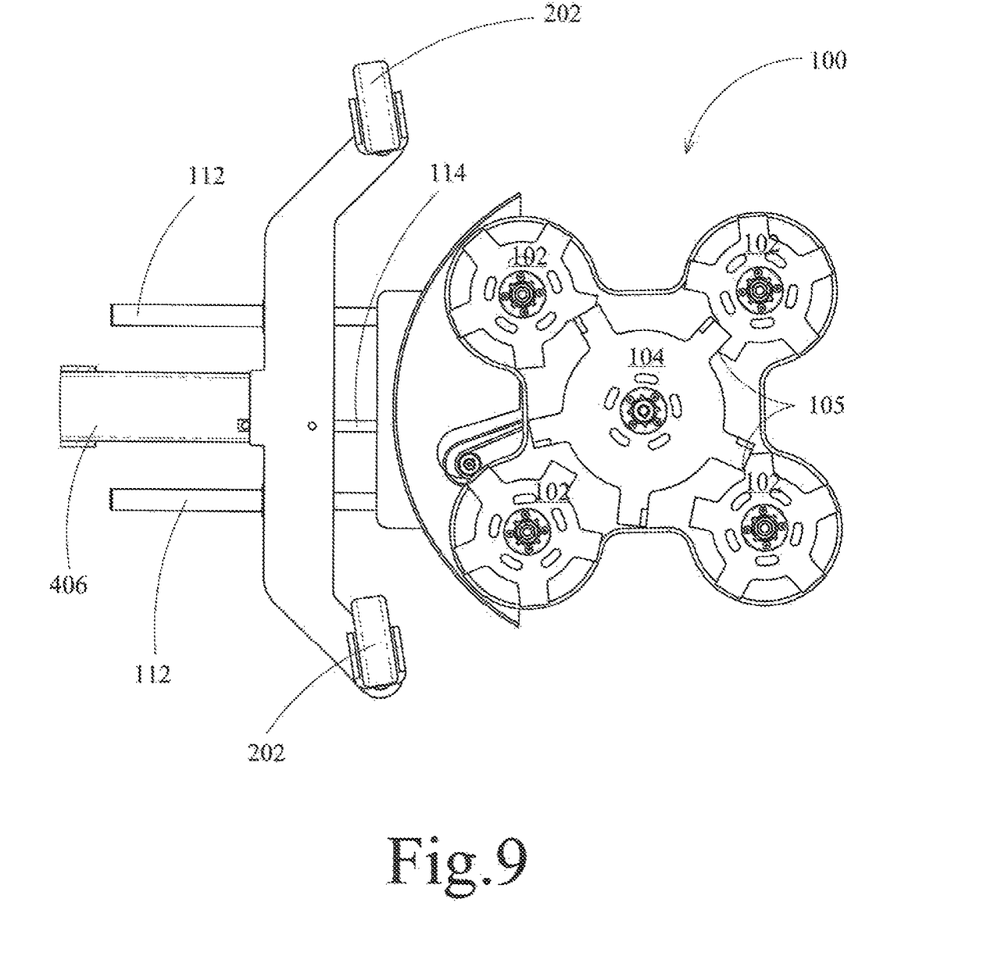
FIG. 9 illustrates a bottom view of the cutting head assembly and carrier assembly.
Figure 11:
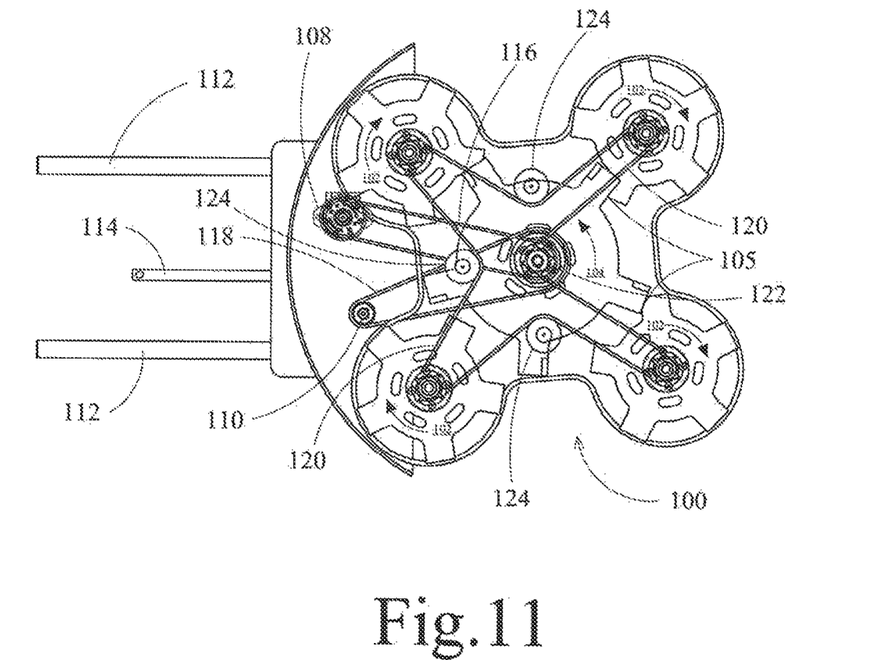
FIG. 11 illustrates a bottom view of the cutting head assembly and belt routing.
Figure 12:
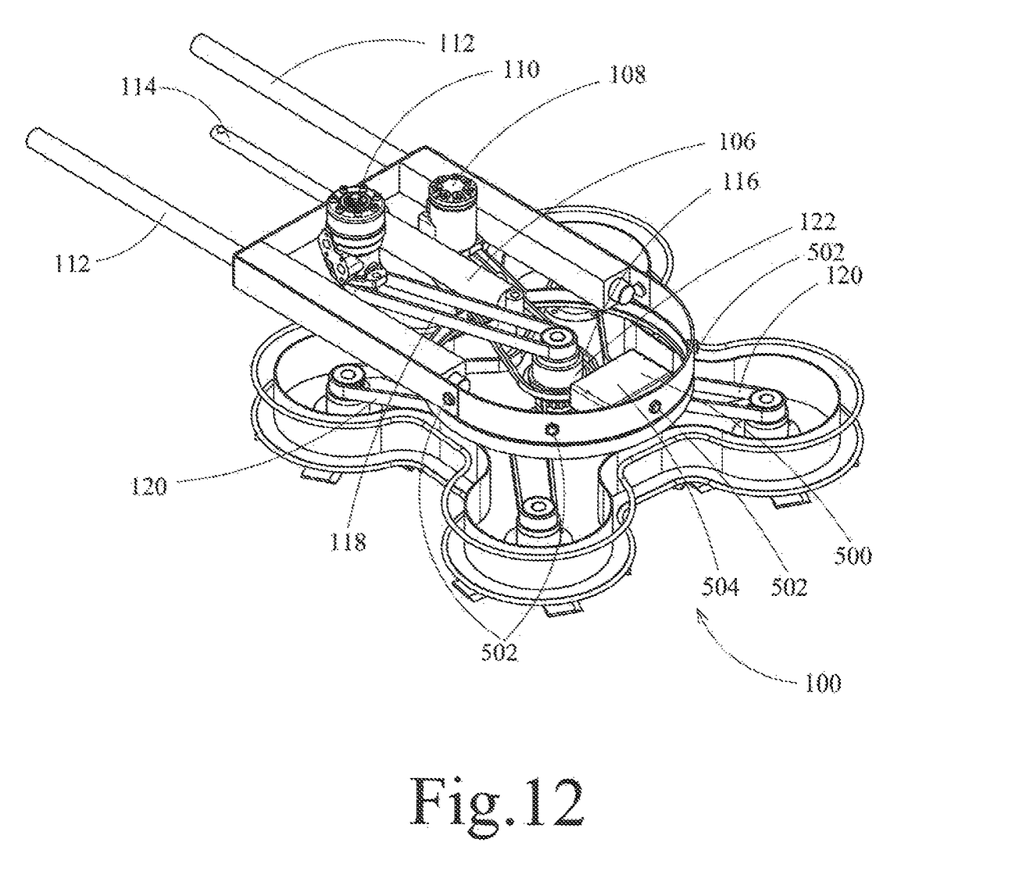
FIG. 12 illustrates an isometric view of internal components of the cutting head assembly.

Referring now to the drawings, wherein like numerals refer to like components, the directional legend shown in FIG. 1 establishes directional references for operational motion of the turf trimmer rotary mowing attachment 150: lateral 600, lateral rotation 602, vertical 604, vertical rotation 606, forward 608, reverse 609, travel rotation 610, and cutting head central axis 612. One embodiment of the rotary mowing attachment 150 is shown in FIGS. 1-3 as having a cutting head assembly 100 that is slidably coupled to a carrier assembly 200. The cutting head assembly 100 can have at least two counter-rotating blades, for example four perimeter clockwise rotating blades 102 and a central counter-clockwise rotating blade 104 as shown in FIGS. 7 and 9. At least one rotator motor 108 can be configured to rotate the cutting head assembly 100 about a cutting head central axis 612. At least one blade drive motor 110 can be configured to drive the at least two counter-rotating blades 102, 104. Both the rotator motor 108 and blade drive motor 110 can be mounted off-center of the cutting head assembly 100 to maximize vertical clearance of the cutting head assembly while cutting underneath objects. Both the rotator motor(s) 108 and the blade drive motor(s) 110 can be direct drive or belt drive. FIGS. 11-12 illustrates a belt drive arrangement wherein a drive motor belt 118 drives the central spindle 122. The central spindle 122 drives the counter-rotating blades 102, 104, via the blades belt 120, which is routed to rotate the four perimeter blades 102 and the central counter-rotating blade 104 in opposite directions. The rotator motor 108 can rotate the cutting head assembly 100 using a rotator belt 116. At least one lateral motion drive motor 106 can be configured to move the cutting head assembly 100 position relative to the carrier assembly 200. As seen in FIGS. 6-8, the lateral motion drive motor 106, which can be a high-speed servo screw motor, moves the cutting head assembly 100 laterally away and towards the carrier assembly 200 for proper alignment with a stationary object, such as a guard rail post 802. The "cloverleaf" arrangement of the rotating blades 102 enables the cutting head assembly 100 to trim the back vertical surface of the guard rail post 802 as well as the front vertical surface and the lateral vertical surfaces, as the cutting head assembly 100 rotates during forward 608 and or reverse 609 movement.

Figure 4:
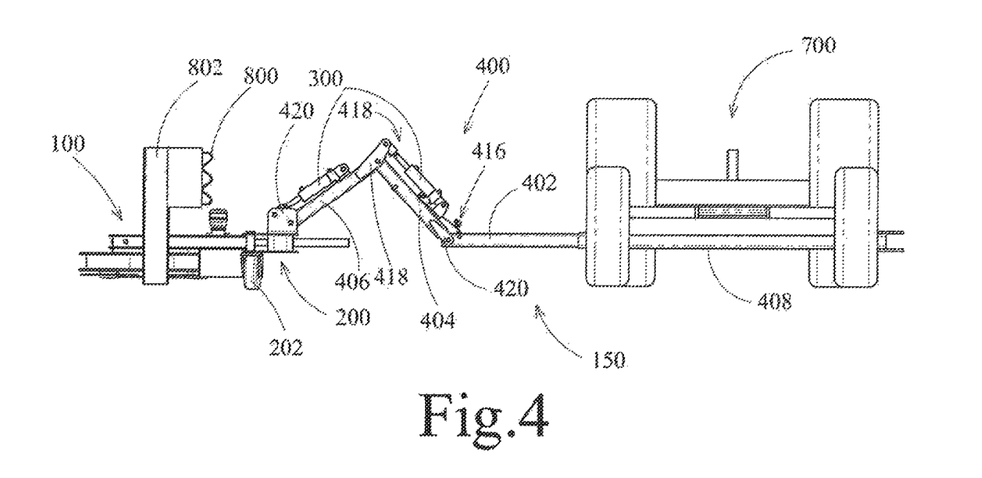
FIG. 4 illustrates a front view of one embodiment of the rotary mowing attachment, carried by a vehicle, as it mows near a guard rail.

As seen in FIG. 4, the rotary mowing attachment 150 can have a boom assembly 400 having multiple sections such as an extending boom 402 that can be adjustably extended from a mount 408. Also, a reach boom 404 can be rotatably coupled to the extending boom 402 at the reach boom proximate end 416 and rotatably coupled to a float boom 406 at an opposing reach boom distal end 418. The float boom 406 can be rotatably coupled to the carrier assembly 200 at a float boom distal end 420. The mount 408 can be removably coupled to a vehicle 700, such as a carrier vehicle, tractor, utility vehicle, or truck.

Figure 5:
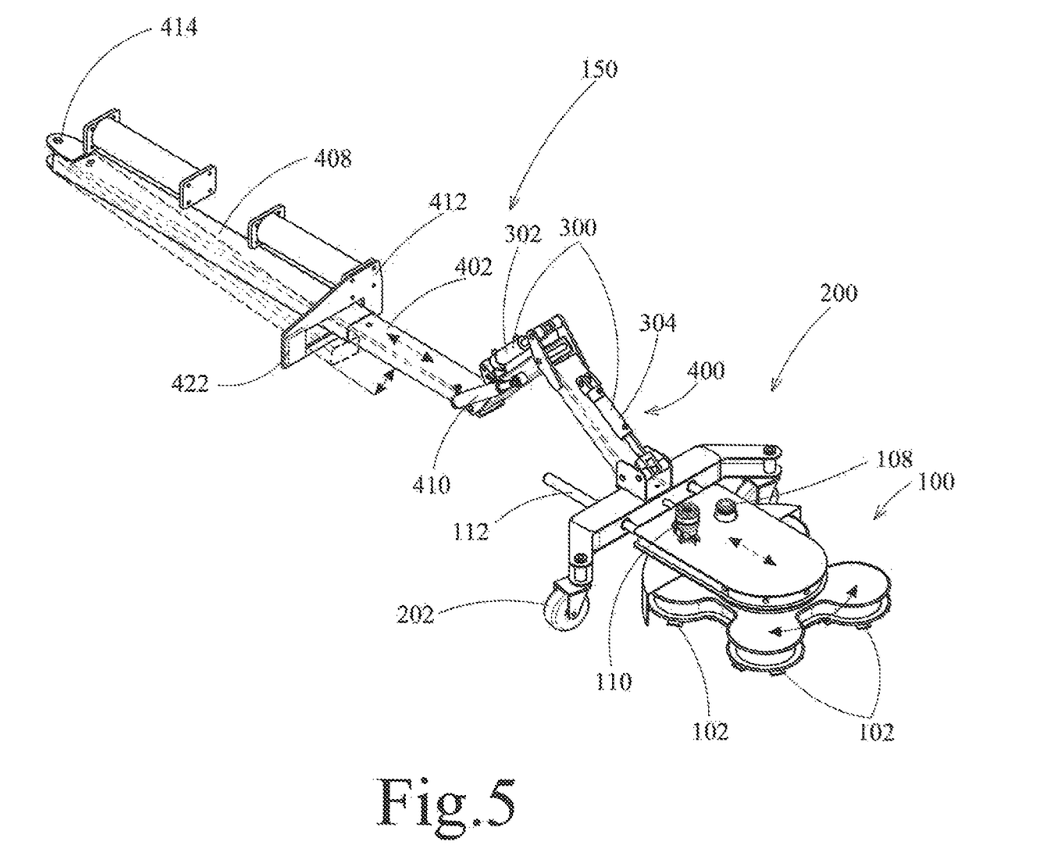
FIG. 5 illustrates an isometric view of one embodiment of the rotary mowing attachment, carried by a vehicle, as it pivots upon undesired strike.

As seen in FIG. 5, the rotary mowing attachment 150 boom assembly 400 can have a boom pivot flange 414 and a boom pivot retainer plate 412 configured to pivot the mount 408, and thereby the entire boom assembly 400, around the boom pivot flange 414 on one end of the mount 408, while the mount 408 slides within an aperture of the boom pivot retainer plate 412 on the opposing end of the mount 408. A biasing element 422, such as a spring or bellows, can be coupled to the boom pivot retainer plate 412 such that the boom assembly 400 is retained in a forward position until an undesired strike of the boom assembly 400 causes reverse movement. The pivoting motion reduces the risk of damaging the boom assembly 400 from an undesired strike.

FIGS. 6-8 illustrate a cutting sequence of a rotary mowing attachment 150 as it trims around a stationary object 802. The rotary mowing attachment 150 carrier assembly 200 can have two or more adjustable casters 202 to support the carrier assembly 200 and the coupled cutting head assembly 100 from the ground during operation, primarily when the cutting head assembly is in float mode. The casters 202 can rotate 360 degrees to enable motion in any direction and the height of the casters 202 can be adjusted for proper positioning of the cutting head assembly 100. A slope adjusting assembly 300 can be removably coupled to the boom assembly 400 to adjust the position of the cutting head assembly 100. The coupling of the carrier assembly 200 to the boom assembly 400 permits the carrier assembly 200 to rotate around the forward/reverse travel axis while the lateral position of the cutting head assembly 100 is adjusted by the lateral motion drive motor 106.

Figure 10:
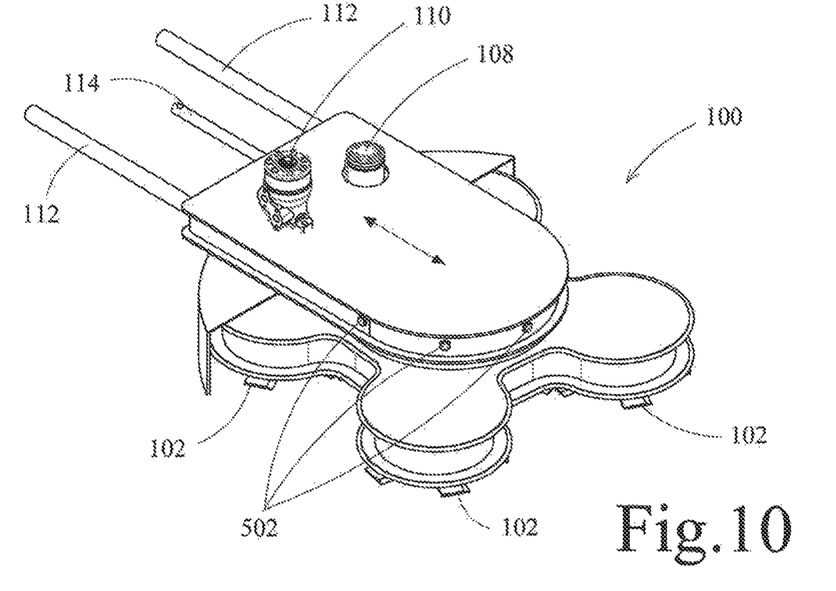
FIG. 10 illustrates an isometric view of the cutting head assembly.

As seen in FIGS. 9-11, at least two slide guides 112 stabilize the cutting head assembly during lateral position adjustment. A lateral motion shaft 114, such as a screw from a high-speed servo screw motor 106, extends from the lateral motion drive motor 106 for lateral position adjustment of the cutting head assembly 100. The rotating blade(s) 102 and the counter-rotating blade 104 can at least partially overlap 105 at the cutting edges of each of the blades to permit bi-directional cutting of vegetation and provide a cleaner cut. The overlap 105 vertical distance between the blades can be adjusted when each blade is installed on the cutting head assembly 100 to prevent contact of the blade cutting edges during operation. Also, the counter-clockwise rotating blade 104 and the rotating blades 102 can be configured in a 'stump jumper' arrangement (not shown in figures), as typical for many rotary cutters, wherein the blade has a plate or dish-shaped central portion with cutting portion of the blade mounted on the outer perimeter edge of the central portion. The outer perimeter edge is vertically offset from the rotating plane of the central portion of the blade thereby allowing the cutting head assembly 100 to skid over and jump any stump or high spot encountered. This prevents the cutting portion of the blades from striking the stump or high spot. This blade arrangement is similar to that used in drum mowers with central rotating drums and skids, the drum mower arrangement being an additional embodiment of the blades disclosed herein.

FIG. 11 illustrates a bottom view of the cutting head assembly 100 with belt routing that enables counter-rotating blades using a single blades belt 120. The drive motor belt 116 drives the central spindle 122 that is engaged with the blades belt, likely through at least one adjustable idler pulley 124. The rotator belt 116 engages with the central spindle 122 to rotate the cutting head assembly 100 about the cutting head central axis 612 in response to control commands from at least one of an operator, the slope adjusting assembly 300, the slope control circuit 500, and the controller 504.

The slope adjusting assembly 300 can have at least one lift cylinder 302, at least one slope cylinder 304 and at least one reach cylinder 410. The slope adjusting cylinders 302, 304, 410 can be driven by hydraulic pressure, electricity, pneumatic pressure, or combinations thereof. Hydraulic pumps, batteries, electric generators, air compressors and other devices that serve the rotary mowing attachment 150 can be tapped from the vehicle or separately self-contained in portable units.

As seen in FIG. 12, the slope adjusting assembly 300 can be in electronic communication with a slope control circuit 500 having at least one of a slope sensor, a proximity sensor 502, a linear cylinder position sensor, a torque sensor, an ultrasonic sensor, a video alignment camera, and combinations thereof. The slope control circuit 500 can be configured for positioning the slope adjusting assembly 300 and controlling the rotator motor 108 to rotate the cutting head assembly 100 and laterally adjust the cutting head assembly 100 position relative to the carrier assembly 200.

The rotary mowing attachment 150 slope control circuit 500 can have a controller configured to transform sensor data into at least one control signal that is transmitted to the slope adjusting assembly 300, thereby positioning and maintaining the cutting head assembly 100 generally parallel with the ground below. The slope control circuit 500 controller can be configured to simultaneously control the rotator motor 108 and lateral motion drive motor 106 to maintain a point-of-avoidance in the range of about 0.0 to 0.75 inches. The point-of-avoidance is generally defined as the distance between the cutting head assembly 100 and an approaching stationary object such as a guard rail post 802. The slope control circuit 500 can further have a user interface such as a manual control switch, a joy stick, or a touch screen.

The rotary mowing attachment 150 can be used to trim around stationary objects, such as a guard rail post 802, using the method steps of: positioning the cutting head assembly 100 in contact with the ground using manual controls; instructing the slope control circuit 500 to enter float-mode for the cutting head assembly 100; extending a boom assembly 400 to align the cutting head assembly 100 with the stationary object 802; aligning the cutting head assembly 100 with the slope of the ground to establish a preset slope in the slope control circuit 500; maintaining and adjusting the preset slope using the slope control circuit 500; adjusting the cutting head assembly 100 position to establish and store a zero-start position; engaging the blade drive motor 110; energizing the slope control circuit 500 to sense and maintain a point-of-avoidance of the cutting head assembly 100 relative to stationary object 802; and, returning the cutting head assembly 100 to the stored zero-start position.

The method can also adjust the float-mode using a slope adjusting assembly 300 attached to a boom assembly 400 portion of the rotary mowing attachment 150, thereby allowing casters 202 on a carrier assembly 200 to be in continuous contact with the ground. The method can further align the cutting head assembly 100 position using manual controls, video image, proximity sensors 502, and combinations thereof. Course boom position adjustments can be made manually and fine boom position adjustments can be made automatically by the slope control circuit 500 to extend and retract the shafts of the slope cylinders 302, 304, 410 and maintain the preset slope. Adjustments to the zero-start rotational and lateral position in the slope control circuit can be made such that forward 608 and reverse 609 travel will properly nest and engage the cutting head assembly 100 with the stationary object 802.

The point-of-avoidance can be maintained by simultaneously rotating the cutting head assembly 100 and adjusting the lateral 600 position of the cutting head assembly 100 during forward 608 and reverse 609 travel. Providing sufficient cutting head assembly 100 rotation between the zero-start position and a finish position can allow the cutting head assembly 100 to engage with all ground-level vertical surfaces of the stationary object 802.

Attaching the rotary mowing attachment 150 to a vehicle 700 which maintains about constant travel speed in the forward 608 direction during mowing operations allows for efficient operation and well-groomed vegetation. If the operator mistakenly swings the rotary mowing attachment 150 into contact with an object, the pivoting boom assembly 400 will slide inside the aperture of the boom pivot retainer plate 412 in forward 608 and/or reverse 609 directions in reaction to the undesired strike of the object. A biasing element 422 can retain and return the boom assembly 400 to a desired operational position until an undesired strike occurs.

This written description uses examples of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotary mowing attachment, comprising:
   a cutting head assembly slidably coupled to a carrier assembly, the cutting head assembly further comprising;
      at least two counter-rotating blades, wherein the at least two counter-rotating blades at least partially overlap at cutting edges of each blade,
      at least one rotator motor configured to rotate the cutting head assembly about a cutting head central axis,
      at least one blade drive motor configured to drive the at least two counter-rotating blades, and
      at least one lateral motion drive motor configured to move the cutting head assembly position relative to the carrier assembly, and
   a boom assembly further comprising;
      an extending boom adjustably extended from a mount,
      a reach boom rotatably coupled to the extending boom at a reach boom proximate end and rotatably coupled to a float boom at an opposing reach boom distal end,
   wherein the float boom is rotatably coupled to the carrier assembly at a float boom distal end, and
   wherein the boom assembly further comprises a boom pivot flange and a boom pivot retainer plate configured to pivot the mount around the boom pivot flange on one end of the mount and slide the mount within an aperture of the boom pivot retainer plate on the opposing end of the mount.

2. The rotary mowing attachment of claim 1, wherein the mount is removably coupled to a vehicle.

3. The rotary mowing attachment of claim 2, wherein the vehicle is a carrier vehicle, tractor, utility vehicle, or truck.

4. The rotary mowing attachment of claim 1, further comprising a biasing element configured to retain the boom assembly in a forward position until an undesired strike of the boom assembly.

5. The rotary mowing attachment of claim 1, wherein the carrier assembly further comprises two or more adjustable casters.

6. The rotary mowing attachment of claim 1, further comprising a slope adjusting assembly removably coupled to the boom assembly, the slope adjusting assembly further comprising at least one lift cylinder, at least one slope cylinder and at least one reach cylinder.

7. The rotary mowing attachment of claim 6, wherein the slope adjusting cylinders are driven by hydraulic pressure, electricity, pneumatic pressure, or combinations thereof.

8. The rotary mowing attachment of claim 7, further comprising a slope control circuit comprising at least one of a slope sensor, a proximity sensor, a linear cylinder position sensor, a torque sensor, an ultrasonic sensor, a video alignment camera, and combinations thereof; the slope control circuit configured for positioning the slope adjusting assembly and controlling the rotator motor to rotate the cutting head assembly and laterally adjust the cutting head assembly position relative to the carrier assembly.

9. The rotary mowing attachment of claim 8, wherein the slope control circuit further comprises a controller configured to transform sensor data into at least one control signal that is transmitted to the slope adjusting assembly, thereby positioning the cutting head assembly generally parallel with the ground below.

10. The rotary mowing attachment of claim 9, wherein the slope control circuit controller is configured to simultaneously control the rotator motor and lateral motion drive motor to maintain a point-of-avoidance in the range of about 0.0 to 0.75 inches between the cutting head assembly and a stationary object.

11. The rotary mowing attachment of claim 9, wherein the slope control circuit further comprises a user interface comprising at least one of a manual control switch, a joy stick, a touch screen, or combinations thereof.

* * * * *